April 18, 1944. B. F. W. HEYER Re. 22,470

BATTERY TESTING APPARATUS

Original Filed March 24, 1938 3 Sheets-Sheet 1

INVENTOR.
B. F. W. Heyer
BY Semmes, Keegin, Beale & Semmes
ATTORNEYS

April 18, 1944. B. F. W. HEYER Re. 22,470

BATTERY TESTING APPARATUS

Original Filed March 24, 1938 3 Sheets-Sheet 2

INVENTOR.
B. F. W. Heyer
BY Semmes, Keegin, Beale & Semmes
ATTORNEYS

April 18, 1944. B. F. W. HEYER Re. 22,470

BATTERY TESTING APPARATUS

Original Filed March 24, 1938 3 Sheets-Sheet 3

INVENTOR.
B. F. W. Heyer
BY Semmes, Keegan Beale & Semmes
ATTORNEYS

Reissued Apr. 18, 1944

Re. 22,470

UNITED STATES PATENT OFFICE 22,470

BATTERY TESTING APPARATUS

Benjamin F. W. Heyer, Tenafly, N. J., assignor to Knickerbocker Development Corporation, Belleville, N. J., a corporation of New Jersey Original No. 2,254,846, dated September 2, 1941, Serial No. 294,736, September 13, 1939, which is a division of Serial No. 197,825, March 24, 1938. Application for reissue July 16, 1942, Serial No. 451,114

15 Claims. (Cl. 175—183)

This application is a division of application for patent serially numbered 197,825, filed by me on March 24, 1938.

My invention relates to new and useful improvements in battery testing apparatus and for the purpose of convenience I have illustrated and will describe my invention in connection with a well-known form of testing apparatus.

With my invention I make use of a single voltmeter having a series of concentric scales arranged one within the other and I employ a single selector switch, which may be moved to any one of a plurality of positions, whereby voltage readings will indicate the conditions of various circuits. Thus with the electrical check unit, which I have selected for the purpose of illustration, certain positions of the selector switch will indicate the conditions of the separate cells of battery, usually three in number. Other positions of the selector switch will disclose cable losses in terms of voltage. Another position will indicate the current draw in terms of voltage loss imposed upon the battery starting motor. Other positions will indicate the value of input and output of battery current and still other positions of the selector switch will indicate the value of the generator current on voltage scales having indications of larger magnitude than in connection with the scale for indicating current drawn in starting.

The first feature which I shall describe and claim is to color by means of conspicuous colors the various segments or multi-segments of the selector switch, so as to coincide with the coloring of the scales of the voltmeter. Thus by giving a distinctive color to each segment or multi-segment of the selector switch, the operator is able to quickly and accurately observe the voltage readings on the selected meter scale, it being understood that the meter is provided with a single pointer, common to all the scales. As a practical matter this arrangement is extremely useful, since if all the scales were of the same color, the operator would have difficulty in following the readings on the selected scale and his observations therefore would be incorrect.

The second feature of my invention is to provide an improved form of spring clip which can be applied to the desired battery post, generally the negative post, said clip remaining in position upon the battery post in good electrical contact therewith, whereby all of the desired tests may be made by the simple operation of the selector switch. The construction and operation of said clip will be hereinafter described and claimed. Speaking generally, battery clips for the most part have been intended for use with voltmeters employing a single scale for indicating the condition of the batteries but my improved clip provides for the making of additional tests as indicated above.

A third feature of my invention is to provide a simplified arrangement by which two shunts of widely different values may be placed into operative condition by the use of a single switch as will be hereinafter more fully described.

The details of my invention will be made clear from the following description taken in connection with the accompanying drawings, forming a part hereof and in which Figure 1 is a diagrammatic view illustrating the circuits and accompanying elements employed with the check unit above referred to;

In all of the accompanying drawings like parts are represented by the same characters of reference.

Figure 1:
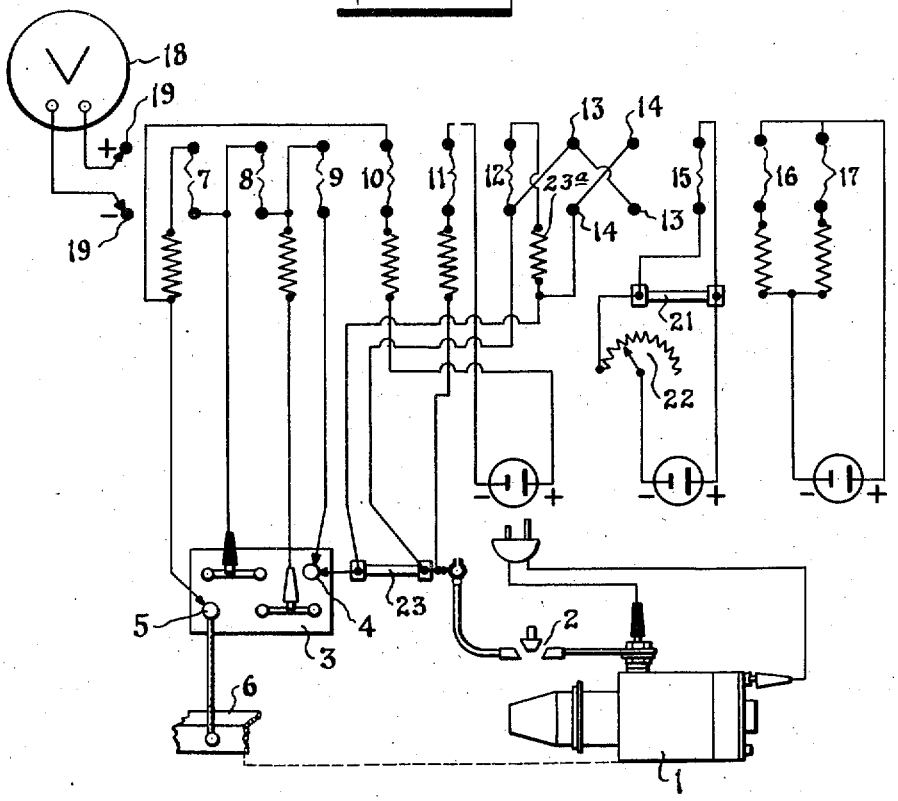
Figure 2:
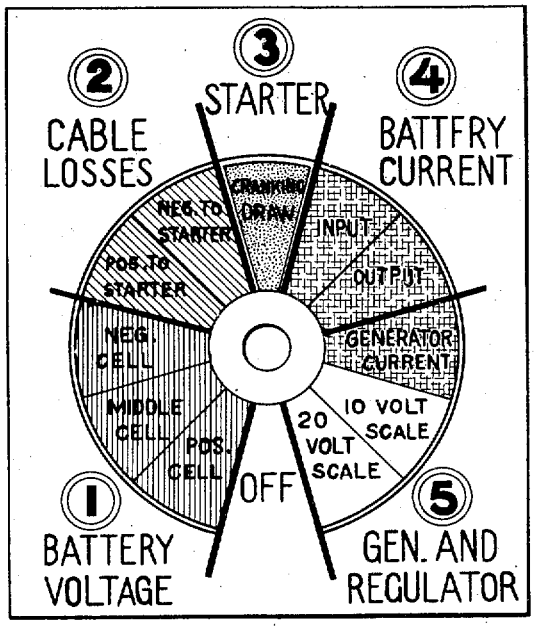
Figure 2 is a front view of the face plate of the selector switch, illustrating the color differentiation of the several positions of the selector switch.

Referring first to Figure 1, 1 is the starting motor, 2 the starting switch, and 3 the storage battery which usually comprises three cells. One terminal 4 of the battery connects with the grounded starting motor 1, the other terminal 5 being grounded to the frame of the automobile. A series of contacts 7—7, 8—8, 9—9, 10—10, 11—11, 12—12, 13—13, 14—14, 15—15, 16—16, and 17—17 constitute the terminals of a selector switch, the movable member of which is caused to engage successively with said contacts. The voltmeter 18 through leads 19—19 is electrically connected to the movable member of the selector switch in order to show the desired voltage readings. As shown in Figure 2 the movable member of the selector switch is carried by a shaft 20 so that the various contacts 7—7 to 17—17 are successively engaged by a rotary movement of said contact member.

As with said electrical check-unit the said contacts provide for the following voltage readings: 7—7, voltage of positive cell; 8—8, voltage of middle cell; 9—9 voltage of negative cell; 10—10 positive lead to starter; 11—11 negative to starter; 12—12, leads to starting switch 2; 12—12 input leads for battery current; 14—14 output leads for battery current; 15—15 contacts for generator current for cooperation with 60 ampere shunt 21 and controlling rheostat 22; 16—16 and 17—17 connections for 10 volt scale and 20 volt scale.

It will be seen from Figure 2 that the positions of the selector switch are indicated by corresponding printed matter and that the group corresponding to contacts 7—7, 8—8, and 9—9 are included in group 1, contacts for 10—10 and 11—11 are included in group 2, the segment for contacts 12—12 is indicated at 3, the segments for contacts 13—13 and 14—14 are indicated by group 4, and the segments for contacts 16—16 and 17—17 are indicated by group 5. The latter figures are enclosed in a double circle. In the circuit between the starting switch 2 and the electrode 4 is a 600 ampere shunt 23 to take care of the heavy starting current drawn from the battery in starting. It will be noted that the segments comprised by the foregoing groups 1, 2, 3 and 5 are given contrasting colors, as for instance, red for group 1, green for group 2, black for segment 3, yellow for group 4 plus the first section of group 5, and silver for the second and third segments of group 5.

Figure 3:
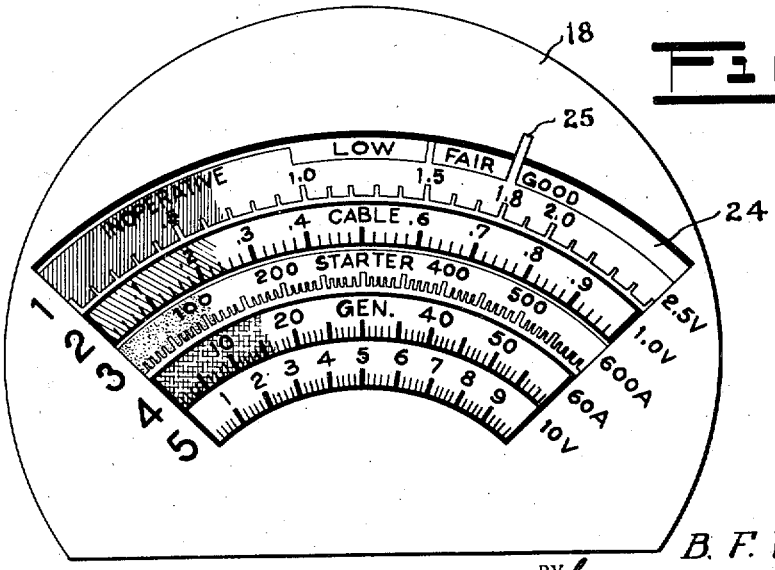
Figure 3 is a front view of the voltmeter, illustrating particularly the several indicating scales thereof.

Referring now to Figure 3 it will be seen that the voltmeter 18 is provided with five scales indicated by the numerals 1, 2, 3, 4 and 5 and colored correspondingly to the coloring on the face of the selector switch.

Cooperating with all of these scales is a single pointer (not shown). The outermost scale reads from zero to 2.5 volts; a portion of this scale indicated at 24 is left silvered and is marked from one volt to 1.5 volts with the word "Low," from 1.5 to 1.8 volts with the word "Fair" and from 1.8 volts to 2.5 volts with the word "Good." A mark 25 extends above the scale for the purpose of emphasizing the minimum point at which the battery is in good condition.

The second scale reads in tenths of a volt from zero to one volt and is to indicate cable losses in $^1/_{100}$ of volts. The third scale indicates starting current measured in terms of voltage and indicating a maximum current flow of 600 amperes, such as would be indicated when the starting motor commences to operate.

The fourth scale indicates battery current and reads from zero to 60 amperes.

The fifth or innermost scale represents the 10 volt and 20 volt scale, measured in terms of 0 to 10 volts. The operation of my improved apparatus is well known to those skilled in the art, having been embodied in thousands of test apparatus now on the market.

Figure 4:
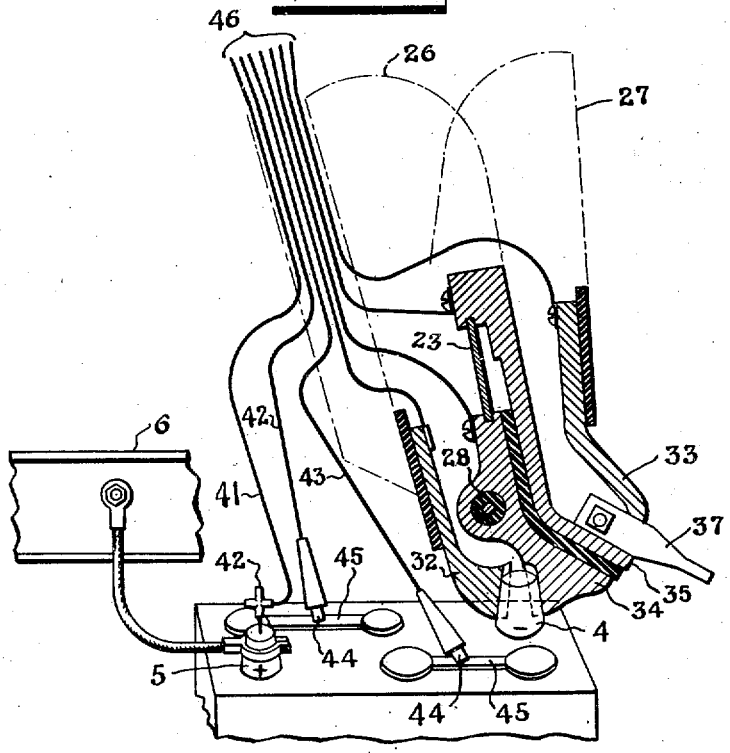
Figure 4 is a sectional diagram of my improved clip, showing the same attached to the battery post.
Figure 5:
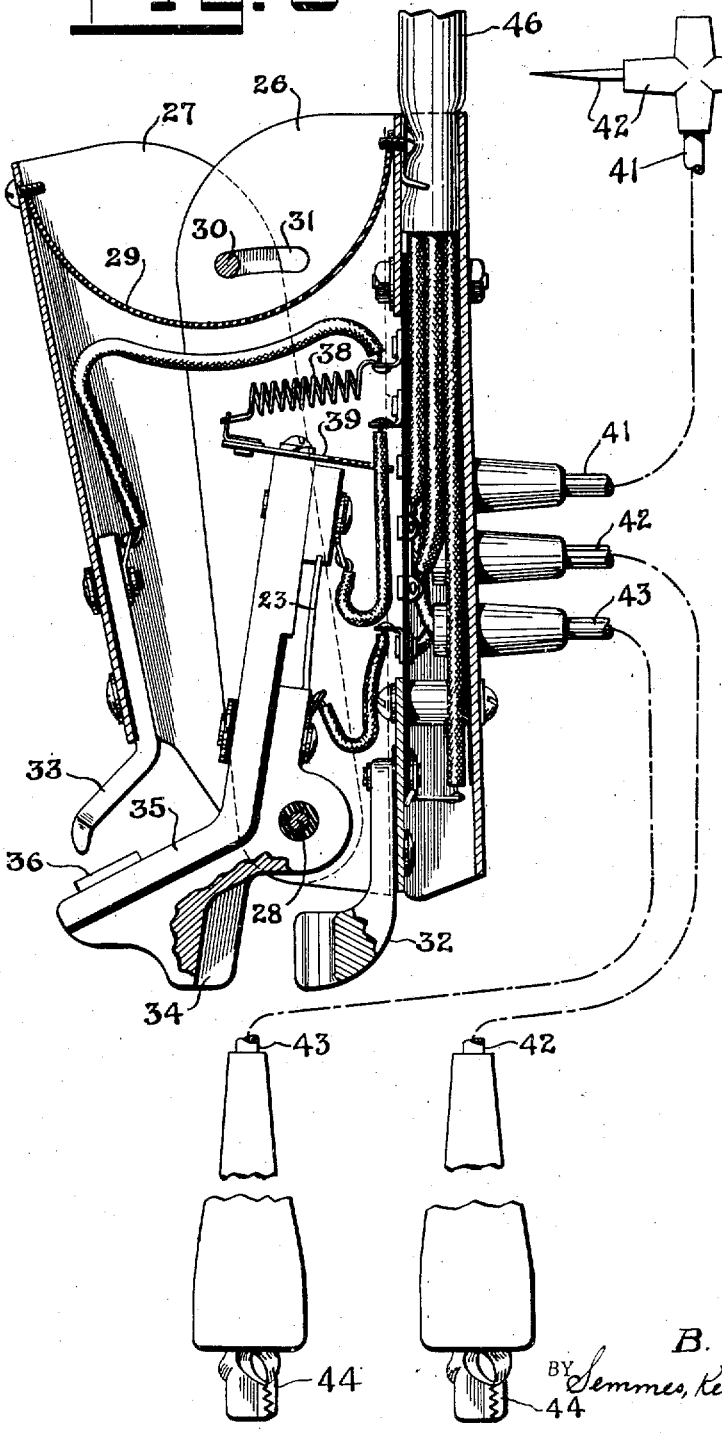
Figure 5 is a sectional view of said clip with associated conductors.
Figure 6:
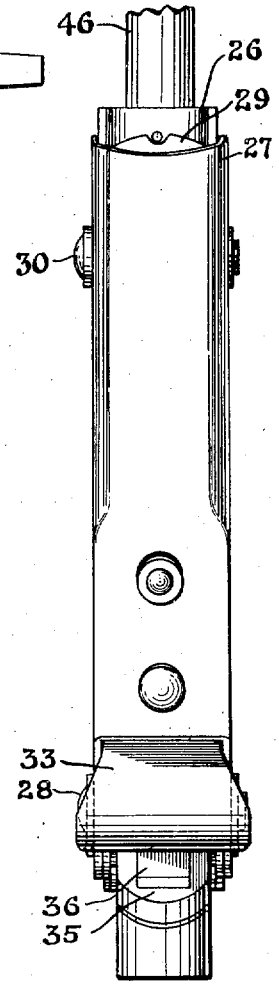
Figure 6 is an elevation of the same viewed from the left.

Referring now to the second feature of my invention, attention is particularly directed to Figures 4, 5 and 6. My improved clip consisted in the first place of two members 26 and 27 pivoted on the pin 28 and normally separated by a strong steel bow spring 29. The extent of pivotal movement is limited by pin 30 carried by the member 27 engaging a slot 31 in the member 26. The member 26 carries an insulated jaw or electrode 32 and the member 27 carries an insulated pressure finger 33.

Located between the jaw or electrode 32 and the pressure finger 33, is an angular pivoted member carried by the pivot 28 and comprising a jaw or electrode 34 and a pressure member 35 carrying an anvil 36. Between pressure member 33 and the anvil 36 is inserted the end of the battery cable 37 which has been removed from the terminal post 4 and placed with its terminal clamp between the members 33 and 36. The clamp will be held tightly in position, while the jaws 32 and 34 will tightly grasp the terminal post 4 under the tension of spring 29.

A spiral spring 38 connects the member 26 with an insulating member 39 carried by the angular piece 35, thus tending to stress the element 35 in the direction of the pressure finger so as to hold the cable clamp 37 in position while the clip is being applied to post 4.

Interposed between the elements 34 and 35 is the 600 ampere shunt 23 heretofore referred to; the elements 32, 33, 34 and 35 are preferably made of heavy bronze casting and are located so as to present a path of minimum length through the 600 ampere shunt 23.

As I have explained, when the starting switch 20 is first closed the initial current may rise to a value of 600 amperes and when steady cranking follows, the value of this current may be between 200 and 300 amperes. As a matter of fact, a shunt capable of carrying 600 amperes for an indefinite time is altogether too cumbersome to be conveniently used in a clip of this character. Consequently, I prefer to use its equivalent, say, a 60 ampere shunt with a suitable multiplier shown in Figure 1 of the drawings at 23*a*, and it will be understood that references herein to a 600 ampere shunt include equivalents of this character. While such a small shunt cannot carry indefinitely the overload which may be imposed upon it, it is quite capable of carrying it for the period required for making the test.

The clip shown in Figure 5 is provided with a cable 41 connected to a pointed electrode 42 adapted to be driven in to make contact with the terminal post 5 as shown in Figure 4. There are two other cables 42—43 carrying spring clamps 44 which are adapted to be engaged with the straps 45—45 connecting the cells.

The various circuit wires leading to the selector switch connect with the various elements of the clip by being carried by an insulating cable 46 as shown in Figure 5.

It will, of course, be understood that my improved clip may be modified in various ways without departing from the spirit of my invention. For example, the two clamping members 32 and 35 may be carried upon the separate channeled sections 26 and 27, whereby the tension of the spring 29 will cause said members to tightly engage the post 4, proper insulation being provided to confine the current to the desired paths. If this arrangement is employed, the pressure finger 33 may be mounted upon a separate pivot and be spring pressed into contact with the cable clamp 37.

With my improved clip when the starter is put into operation, a current of from 200 to 600 amperes is required which necessitates a heavy shunt, or its equivalent, and the employment of a special scale such as scale No. 3 in Figure 3. As soon as the motor starts, the generator either charges at a rate generally not over 40 amperes into the battery, or if the generator is not operating, the battery will discharge and supply ignition lights and other accessories at a 10 to 25 ampere rate. However, if the 600 ampere shunt is still in circuit it will still measure these currents of lesser value, but because of the small deflection on the scale it will be almost impossible to get a close or accurate reading.

In order to overcome this difficulty, the second shunt 21 of higher resistance, 60 ampere, for example, is provided and a corresponding position on the selector switch so that a 600 ampere shunt or its suggested equivalent, the 60 ampere shunt with a multiplier, may be cut out and a 60 ampere shunt without a multiplier cut in, whereby readings amplified ten fold may be observed on scale 4.

Having now described my invention what I claim as new therein and desire to secure by Letters Patent is as follows:

1. In a battery testing unit, a clip therefor adapted to be applied to a battery during the making of a plurality of tests, said clip comprising, in combination, a pair of spring pressed members pivoted together, an electrode carried by one of said members and adapted to engage a battery post from which a cable clamp normally mounted thereon has been removed, a supporting member mounted on the same pivot as said spring pressed members, a second electrode carried by said supporting member and adapted to also engage said post, and a pressure member carried by one of said spring pressed members and adapted to receive between itself and the supporting member the removed cable clamp, whereby the post will be held in spring pressed engagement between said electrodes.

2. In a battery testing unit, a clip therefor adapted to be applied to a battery during the making of a plurality of tests, said clip comprising in combination a pair of spring pressed members pivoted together, an electrode carried by one of said members and adapted to engage a battery past from which a cable clamp normally mounted thereon has been removed, a supporting member mounted on the same pivot as said spring pressed members, a second electrode carried by said supporting member and adapted to also engage said post, a pressure member carried by one of said spring pressed members and adapted to receive between itself and the supporting member, the removed cable clamp, whereby the post will be held in spring pressed engagement between said electrodes, and an auxiliary spring connected to said supporting member for retaining the cable clamp in position during the application of the clip.

3. In a battery testing unit, a clip therefor adapted to be applied to a battery during the making of a plurality of tests, said clip comprising, in combination, a pair of spring pressed electrodes adapted to engage one of the posts of said battery from which a cable clamp normally mounted thereon has been removed, a pressure member cooperating with one of said electrodes for engagement with the removed cable clamp, a cable associated with said clip and a pointed connector associated with said cable and adapted to make connection with the other battery post by being driven therein.

4. In a battery testing unit, a clip therefor adapted to be applied to a battery during the making of a plurality of tests, said clip comprising in combination a pair of spring pressed electrodes, adapted to engage one of the posts of said battery from which a cable clamp normally mounted thereon has been removed, a pressure member cooperating with one of said electrodes for engagement with the removed cable clamp, a cable associated with said clip, a pointed connector associated with said cable and adapted to make connections with the other battery post by being driven therein, two other cables associated with said clip and clamps associated with the latter cables for engagement with the two straps which connect the middle cell with the two outside cells.

5. In a battery testing unit a clip therefor adapted to be applied to a battery during the making of a plurality of tests, said clip comprising in combination a pair of spring-pressed members pivoted together, an electrode carried by one of said members and adapted to engage the battery post, a second electrode pivotally mounted on said other member and also adapted to engage the battery post, a metallic shunt mounted on said second electrode substantially as closely as possible to the portion which engages with the battery post.

6. In a battery testing unit a clip according to claim 1, in which a metallic shunt is mounted on said second electrode.

7. In a battery testing unit a clip according to claim 2, in which a metallic shunt is mounted on said second electrode.

8. In a battery testing unit according to claim 3 in which a metallic shunt is mounted on the electrode with which said pressure member cooperates.

9. In a battery testing unit a clip according to claim 4 in which a metallic shunt is mounted on the electrode with which said pressure member cooperates.

10. In a circuit testing unit, a clip to be interposed between a terminal of an element in said circuit and the end of a cable normally engaged with said terminal, said clip comprising an electrode having two separate contact members insulated from each other, a pressure member cooperating with one contact member for receiving the terminal of said element therebetween after removal of the cable therefrom, a pressure member cooperating with the other contact member for receiving the end of the removed cable therebetween, and means cooperating with said pressure members for pressing said pressure members against said terminal and cable end to press the terminal and cable end into current conducting engagement with the respective contact members.

11. In a circuit testing unit, a clip to be interposed between a terminal of an element in said circuit and the end of a cable normally engaged with said terminal, said clip comprising an electrode having two separate contact members insulated from each other, a pressure member pivotally connected to said electrode and cooperating with one contact member for receiving the terminal of said element therebetween after removal of the cable therefrom, a second pressure member pivotally connected to said electrode and cooperating with the other contact member for receiving the end of the removed cable therebetween, and means cooperating with said pressure members for pressing said pressure members against said terminal and cable end to press the terminal and cable end into current conducting engagement with the respective contact members of said electrode.

12. In a circuit testing clip, a clip to be interposed between a terminal of an element in said circuit and the end of a cable normally engaged with said terminal, said clip comprising an electrode having two separate contact members insulated from each other, a pressure member cooperating with one contact member for receiving the terminal of said element therebetween after removal of the cable therefrom, a pressure member cooperating with the other contact member for receiving the end of the removed cable therebetween, means cooperating with said pressure members for pressing said pressure members against said terminal and cable end to press the terminal and cable end into current conducting engagement with the respective contact members, and a metal shunt mounted on said electrode and connected between said contact members.

13. In a circuit testing unit, a clip to be interposed between a terminal of an element in said circuit and the end of a cable normally engaged with said terminal, said clip comprising an electrode having two separate contact members insulated from each other, a pressure member pivotally connected to said electrode and cooperating with one contact member for receiving the terminal of said element therebetween after removal of the cable therefrom, a second pressure member pivotally connected to said electrode and cooperating with the other contact member for receiving the end of the removed cable therebetween, means cooperating with said pressure members for pressing said pressure members against said terminal and cable end to press the terminal and cable end into current conducting engagement with the respective contact members of said electrode, and a metal shunt mounted on said electrode and connected between said contact members.

14. In a circuit testing unit, a clip to be interposed between a terminal of an element in said circuit and the end of a cable normally engaged with said terminal and removed therefrom, said clip comprising a pair of members for gripping the terminal of said element, one of said gripping members having a conductor portion, insulation interposed between said gripping member and the conductor portion thereof, and a pressure member cooperating with the conductor portion for engaging the removed cable therebetween.

15. In a circuit testing unit, a clip to be interposed between a terminal of an element in said circuit and the end of a cable normally engaged with said terminal and removed therefrom, said clip comprising a pair of members for gripping the terminal of said element, one of said gripping members having a conductor portion, insulation interposed between said gripping member and the conductor portion thereof, a pressure member cooperating with the conductor portion for engaging the removed cable therebetween, and a shunt connecting said conductor portion and the gripping member with which it is associated.

BENJAMIN F. W. HEYER.